United States Patent
Chen

(10) Patent No.: US 11,211,024 B2
(45) Date of Patent: Dec. 28, 2021

(54) DISPLAY PANEL AND DISPLAY DEVICE

(71) Applicants: HKC Corporation Limited, Shenzhen (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/628,969

(22) PCT Filed: Oct. 16, 2017

(86) PCT No.: PCT/CN2017/106321
§ 371 (c)(1),
(2) Date: Jan. 6, 2020

(87) PCT Pub. No.: WO2019/006906
PCT Pub. Date: Jan. 10, 2019

(65) Prior Publication Data
US 2020/0126504 A1     Apr. 23, 2020

(30) Foreign Application Priority Data
Jul. 6, 2017  (CN) .......................... 201710546111.6

(51) Int. Cl.
*G09G 3/36*          (2006.01)

(52) U.S. Cl.
CPC ......... *G09G 3/3688* (2013.01); *G09G 3/3696* (2013.01); *G09G 2310/08* (2013.01)

(58) Field of Classification Search
CPC ....... G09G 2330/021; G09G 2330/022; G09G 2340/0435; G09G 2310/08; G09G 3/3618; G09G 2320/103; G06G 2370/08
See application file for complete search history.

(56) References Cited

U.S. PATENT DOCUMENTS

| | | | |
|---|---|---|---|
| 6,407,728 B1 * | 6/2002 | Sekine | G09G 3/3614 345/90 |
| 2004/0222961 A1 * | 11/2004 | Lin | G09G 3/3688 345/103 |
| 2006/0028405 A1 * | 2/2006 | Moon | G09G 3/296 345/60 |
| 2007/0063959 A1 * | 3/2007 | Iwabuchi | G09G 3/3688 345/100 |

(Continued)

FOREIGN PATENT DOCUMENTS

| CN | 104123906 A | 10/2014 |
|---|---|---|
| CN | 106782311 A | 5/2017 |

*Primary Examiner* — Dong Hui Liang
(74) *Attorney, Agent, or Firm* — Wang Law Firm, Inc.

(57) ABSTRACT

Disclosed is a display panel. The display panel includes: a substrate; a plurality of data lines, formed in a display area of the substrate; a data driving circuit, used for driving the data lines; an active switches, connected to the data driving circuit and the data lines; and a control module, coupled with a control ends of the active switches. The control module controls the active switch to be switched off while the previous frame of image information is the same as the current frame of image information.

15 Claims, 4 Drawing Sheets

(56) References Cited

U.S. PATENT DOCUMENTS

| | | | |
|---|---|---|---|
| 2012/0162238 A1* | 6/2012 | Fleck | G09G 3/20 345/545 |
| 2014/0022234 A1* | 1/2014 | Ogawa | G09G 3/3618 345/213 |
| 2015/0029167 A1* | 1/2015 | Tanaka | H04N 5/21 345/204 |
| 2017/0358261 A1* | 12/2017 | Zhou | G09G 3/3258 |
| 2018/0090079 A1* | 3/2018 | Jang | G09G 3/3406 |

* cited by examiner

DISPLAY PANEL AND DISPLAY DEVICE

CROSS-REFERENCE TO RELATED APPLICATION

This application claims priority to China Patent Application No. 201710546111.6 filed on Jul. 6, 2017, and entitled "display panel and display device" at State Intellectual Property Office of the P.R.C, the entirety of which is hereby incorporated by reference.

BACKGROUND

1. Field

The present disclosure relates to a display technology field, more particularly to a display panel and a display device.

2. Description of the Related Art

Display devices are widely applied because of their advantages of thin-size, power-saving, and non-radiation. In recent years, most displays are backlight-type display device including a display panel and a backlight module. The working principle of the display panel is that liquid crystal molecules are disposed between two substrates disposed in parallel with each other, and a drive voltage is applied on the two substrates to control orientation of liquid crystal molecules to refract light emitted from the backlight module, so as to display an image.

The thin film transistor-liquid crystal displays (TFT-LCD) have advantages of low power consumption, excellent screen image quality and higher production yield, so the TFT-LCD device gradually become a main stream display product. Similarly, the TFT display includes a display panel and a backlight module, and the display panel includes a color film substrate and a TFT substrate, and transparent electrodes are formed on the relatively-inner side of the substrate. A liquid crystal layer is disposed between the two substrates. By using electric field to control orientation of the liquid crystal molecule to change polarization state of light, a polarizing plate can then selectively pass or block light, so that the display panel can display an image, The conventional display device has a 60 Hz of panel refresh rate, that is, the screen is refreshed by 60 times per second, each refresh operation is to charge and discharge each of display pixels in a display area; however, if the display panel shows a static image, but the display pixels are refreshed continually, it causes unnecessary power consumption.

SUMMARY

The present disclosure provides a display panel including: a substrate; a plurality of data lines formed in the display area of the substrate; a data driving circuit configured to drive the plurality the data lines; a plurality of active switches electrically connected to the data driving circuit and the plurality of data lines; a control module electrically coupled to the control ends of the active switches; when the previous frame image information is the same as the current frame image information, the control module turns off the active switches.

The present disclosure further provides a display panel, the display panel includes a substrate; a plurality of data lines formed in the display area of the substrate; a data driving circuit configured to drive the plurality the data lines; a plurality of active switches electrically connected to the data driving circuit and the plurality of data lines, and disposed on the data driving circuit; a control module electrically coupled to the control end of the active switch; a high level signal port electrically coupled to the control end of the active switch through a resistor; a control circuit board electrically coupled to the data driving circuit and the active switches; and a timing control circuit electrically coupled to the control circuit board and the data driving circuit. When the previous frame image information is the same as the current frame image information, the control module turns off the active switches. Each of the plurality of data lines is disposed correspondingly to one of the plurality of active switches. The number of the control pins of the control module is the same as a number of the active switches, and the control ends of the active switches are electrically couple to the control pins corresponding thereto, respectively.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
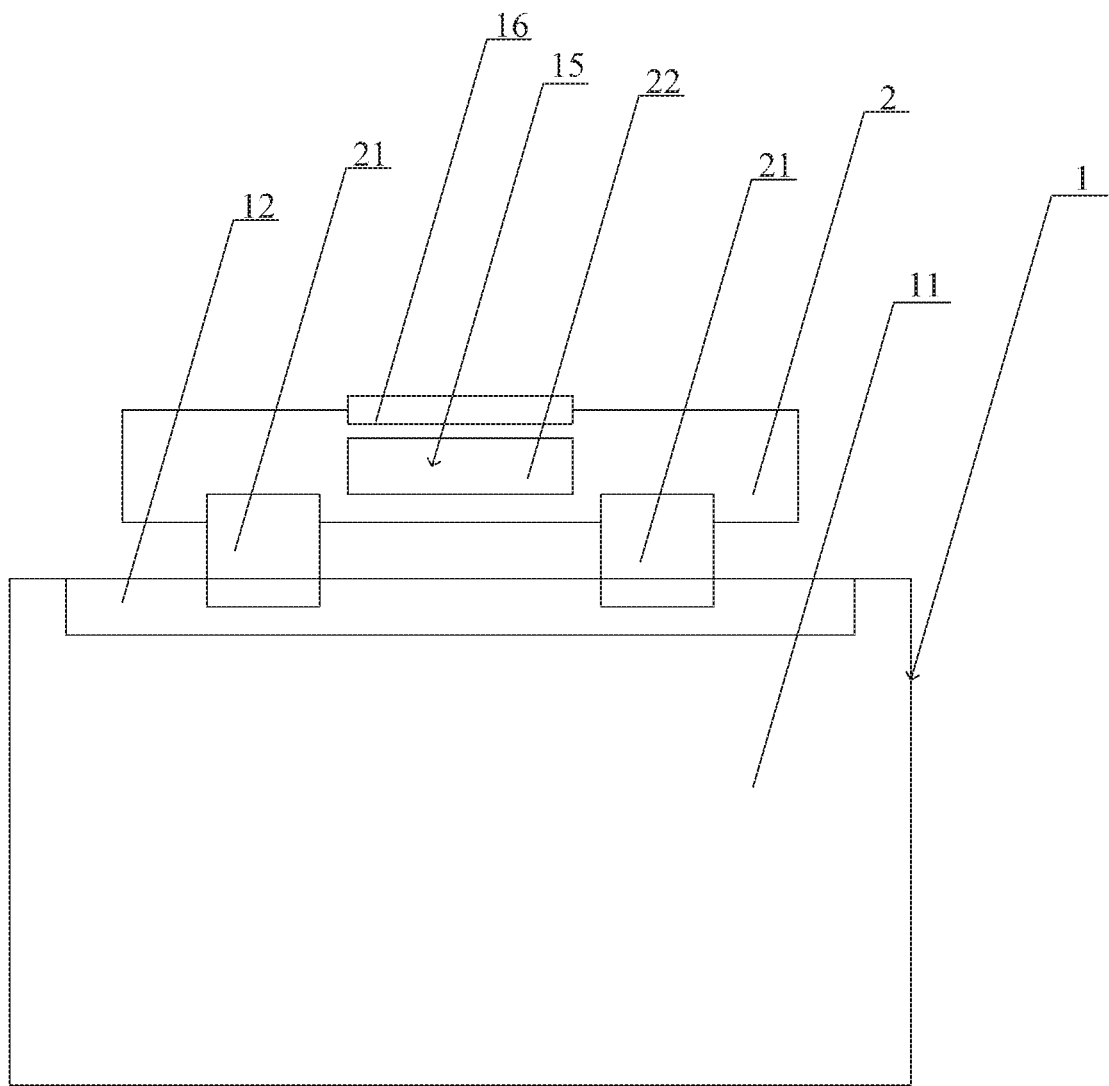
FIG. 1 is a schematic structural view of a display panel of an embodiment of the present disclosure.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

Figure 2:
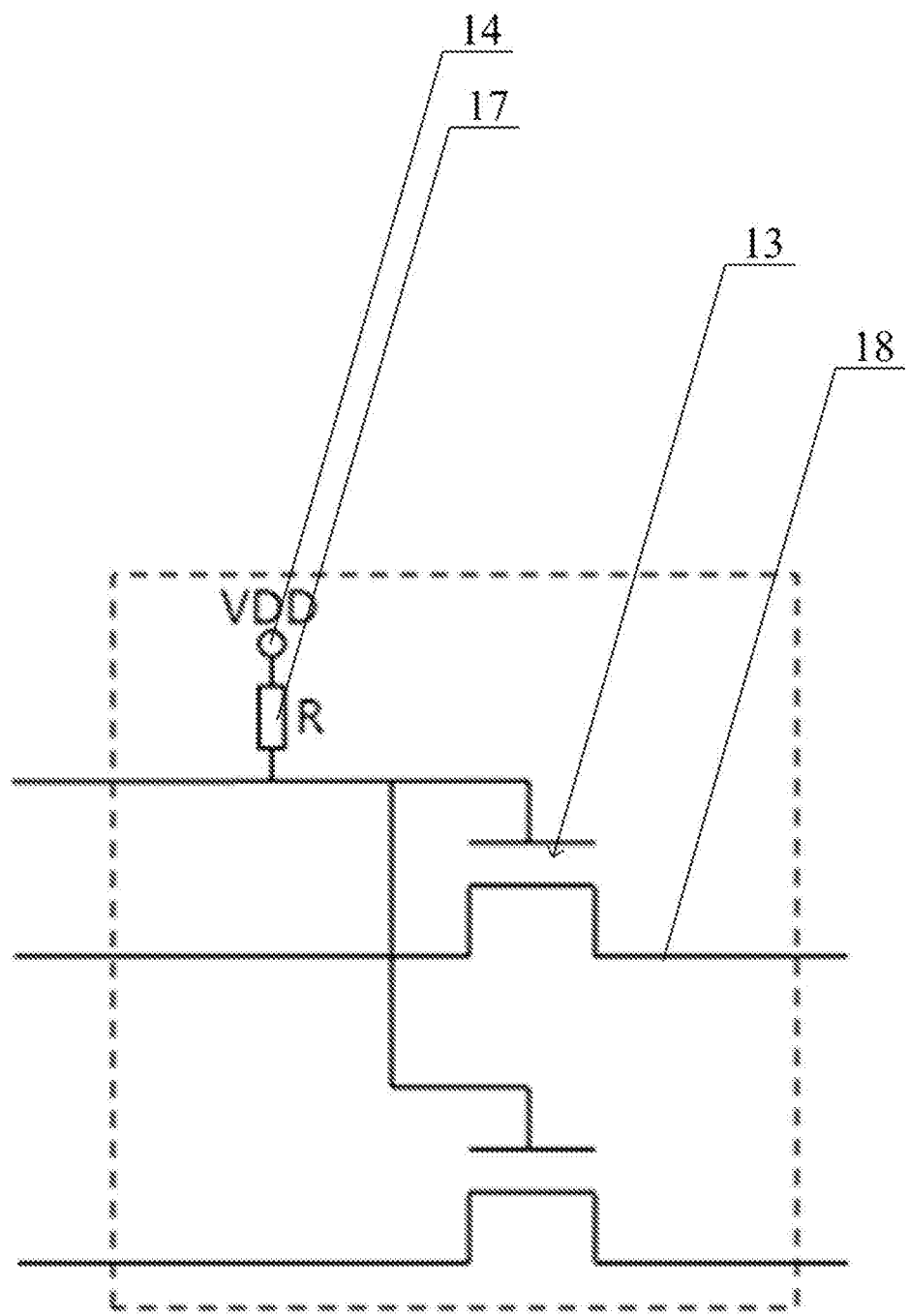
FIG. 2 is a circuit diagram of an active switch of a display panel of an embodiment of the present disclosure.

The present disclosure is to provide a display panel which can effectively reduce power consumption As shown in FIGS. 1 and 2, the present disclosure provides a display panel. The display panel comprises a substrate 1; a plurality of data lines 18 formed in a display area 11 of the substrate 1; a data driving circuit 21 configured to drive the plurality the data lines 18; a plurality of active switches 13 electrically connected to the data driving circuit 21 and the plurality of data lines 18; and a control module 15 electrically coupled to the control ends of the active switches 13. When previous frame image information is the same as current frame image information, the control module 15 turns off the active switches 13.

The active switch 13 is electrically connected to the data driving circuit 21 and the data line 18, so the signal transmission between the data driving circuit 21 and the data lines 18 can be effectively controlled. The active switches 13 are used to separate the output of the data driving circuit 21 and the actual input of the display panel, to selectively refresh the display area 11 of the substrate 1. When the system is operated normally, the display panel can store a previous frame image and compare a current frame image with the previous frame image; when the current frame image is different from the previous frame image, the control module 15 turns on the active switches 13, the signals can be normally transmitted between the data driving circuit 21 and the data lines 18, the system can refresh normally; when the previous frame image is stored, and the current frame image is the same as the previous frame image, the control module 15 turns off the active switches 13, the data driving circuit 21 is unable to input signals into the display area 11 of the substrate 1, so that the display area is not refreshed, and power consumption of the display panel can be effectively decreased; furthermore, the user's operation cost can be decreased, so that the display panel can be more competitive. This technical solution does not greatly increase apparatus cost, and just needs to slightly improve the process of the existing the display panel to electrically connect the active switches 13 to the data driving circuit 21 and the data lines 18, so as to selectively refresh the display area 11 of the display panel. When the screen is at the dynamic state, for example, the screen is displaying video or game, or scroll text, the screen can maintain the normal refresh frequency, and each refresh operation is to charge and discharge each of the display pixels in a display area 11; however, when the display panel shows a static image, the screen can stop refreshing the display area 11 of the display panel, so as to effectively reduce power consumption, more environmental protection.

Each of the plurality of data lines 18 corresponds to one of the plurality of active switches 13; for example, the active switch 13 can be a thin-film transistor or other active switch. The active switch 13 is disposed on each the data line 18 corresponding thereto, to selectively refresh the display pixels in the display area 11, more effectively decrease the power consumption of the display panel, and decrease the user's operation cost, so that the display panel can be more competitive; the solution of disposing an active switch 13 on each the data line 18 corresponding thereto can be implemented by slightly improving the process of the display panel without greatly increasing apparatus cost, so that the cost for improvement of the display panel can be decreased.

The control end of each of plurality of active switches 13 is electrically coupled to the same pin of the control module 15, so that all frame images can be controlled uniformly, and the active switches 13 can be simultaneously controlled by generating only one control instruction, so as to effectively decrease computation time of the control module 15, and further decrease image delay of the display area 11, so that the screen image can be displayed more smoothly, to provide the user better viewing experience. When the power consumption of the control module 15 can be effectively decreased, the level of the power consumption of entire the display panel, can also effectively decreased to save power, provide more environmental protection, and effectively satisfy requirement for the product with lower power consumption.

The number of the control pins of the control module 15 is the same as a number of the active switches 13, and the control ends of the active switches 13 are electrically couple to the control pins corresponding thereto, respectively. Each active switch 13 can be electrically connected to the control pin of the control module corresponding thereto, so as to selectively refresh the display pixels in the display area 11, to more effectively decrease the power consumption of the display panel and further decrease the user's operation cost, so that the display panel can be more competitive. According to an embodiment, the display pixel, which does not need to update state, is not refreshed, so as to reduce power consumption of the display panel, and control the display pixels to selectively refresh more accurately.

The display panel comprises a high level signal port 14, and the control end of each of the active switches 13 is electrically couple to the high level signal port 14 through a resistor 17. The high level signal port 14 can effectively prevent poor contact between the control module 15 and the active switch 13, to ensure the display panel to normally display and further improve the lifetime of the display panel. In a condition that some of the active switches 13 and the pins of the control module 15 are in poor contact caused during production process or transport process of the display panel, after the display panel receives power and the systems signal, the high level signal enables the active switch 13, which is in poor contact, to be turned on, to maintain the normal refresh frequency, and each refresh operation is to charge and discharge each of the display pixels in a display area 11, so as to ensure other active switches 13, which are not in poor contact, to effectively decrease power consumption of the display panel, ensure the display panel to have good display effect. As a result, the poor contact between the active switch 13 and the pin of the control module does not cause display problem of the display panel, so that the display panel having the active switch 13 can has lower reduce power consumption and be more competitive.

The display panel comprises a control circuit board 2, and the data driving circuit 21 and the plurality of active switches 13 are disposed on the control circuit board 2. The data driving circuit 21 and the active switches 13 are disposed on the control circuit board 2, the data driving circuit 21 can be effectively fixed and mounted to ensure the data driving circuit 21 to be in good contact with the data lines 18, further improve the endurability of the display panel. The control circuit board 2 includes the connection module 16 to receive the inputted data signal, such as the signal from U disk or DVD, more smoothly.

The control circuit board 2 includes a timing control circuit 22 disposed thereon and configured to store the image information, and the timing control circuit 22 is electrically coupled to the data driving circuit 21. The pixel units (such as R/G/B pixel) can be electrically connected to the connection module 16 on the control circuit board 2 through wires to receive compression signals, control signals and power. The data driving circuit 21 of the control circuit board 2 is electrically connected to the display area, so that after the timing control circuit 22 on the control circuit board 2 processes the data, the processed data and power can be transmitted to the display area 11 of the substrate 1. When the timing control circuit 22 is electrically coupled to the data driving circuit 21, the control signals can be effectively transmitted to the display area 11 of the substrate 1 through the data driving circuit 21, the timing control circuit 22 can store the previous frame image and compare the current frame image with the previous frame image. When the current frame image is different from the previous frame image, the timing control circuit 22 turns on the active switches 13, the data signal is transmitted to the display area 11 of the substrate 1 through the output end of the active switch 13, the system can refresh normally; when the current frame image is the same as the previous frame image, the timing control circuit 22 turns off the active switches 13, the data driving circuit 21 is unable to output signal to the display area 11, so that the display area is not refreshed and does not cause power consumption, thereby achieving purpose of selectively refreshing display, decreasing power consumption of the display panel, and satisfying the requirement for the product with lower power consumption.

The data driving circuit 21 is electrically connected to an edge of the substrate 1, and the substrate 1 comprises a fan-out area 12 disposed between the data driving circuit 21 and the plurality of data lines 18, and the plurality of active switches 13 are disposed in the fan-out area 12. The active switches 13 are disposed in the fan-out area 12 of the substrate 1, the data driving circuits 21 with different designs can commonly use the active switches, so that the data driving circuit 21 can be more shareable, thereby effective decreasing management cost, improving efficiency in development of the display panel. Furthermore, the plurality of active switches 13 are disposed in the fan-out area 12, so the technical solution does not increase apparatus cost and just needs to slightly improve the process of the existing the display panel to electrically connect the active switches 13 to the data driving circuit 21 and the data lines 18, so that the function of selectively refreshing the display area 11 of the display panel can be implemented.

The plurality of active switches 13 are disposed on the data driving circuit 21, and the active switch 13 is disposed on the data driving circuit 21 to be more compatible to the substrate 1 with different sizes, so as to improve the application scope of the data driving circuit 21. Furthermore, the plurality of active switches 13 disposed on the data driving circuit 21 do not greatly increase apparatus cost and just need to slightly improve the process of the existing the data driving circuit 21 to electrically connect the active switches 13 to the data driving circuit 21 and the data lines 18, so as to selectively refresh the display area 11 of the display panel. According to an embodiment, for the display panel which does not include the active switch 13 disposed between the data driving circuit 21 and the data line 18, its original data driving circuit can be replaced by the data driving circuit 21 having the active switch 13, so that the display panel is able to selectively refresh the display area 11, to effectively reduce power consumption and provide more environmental protection.

Figure 3:
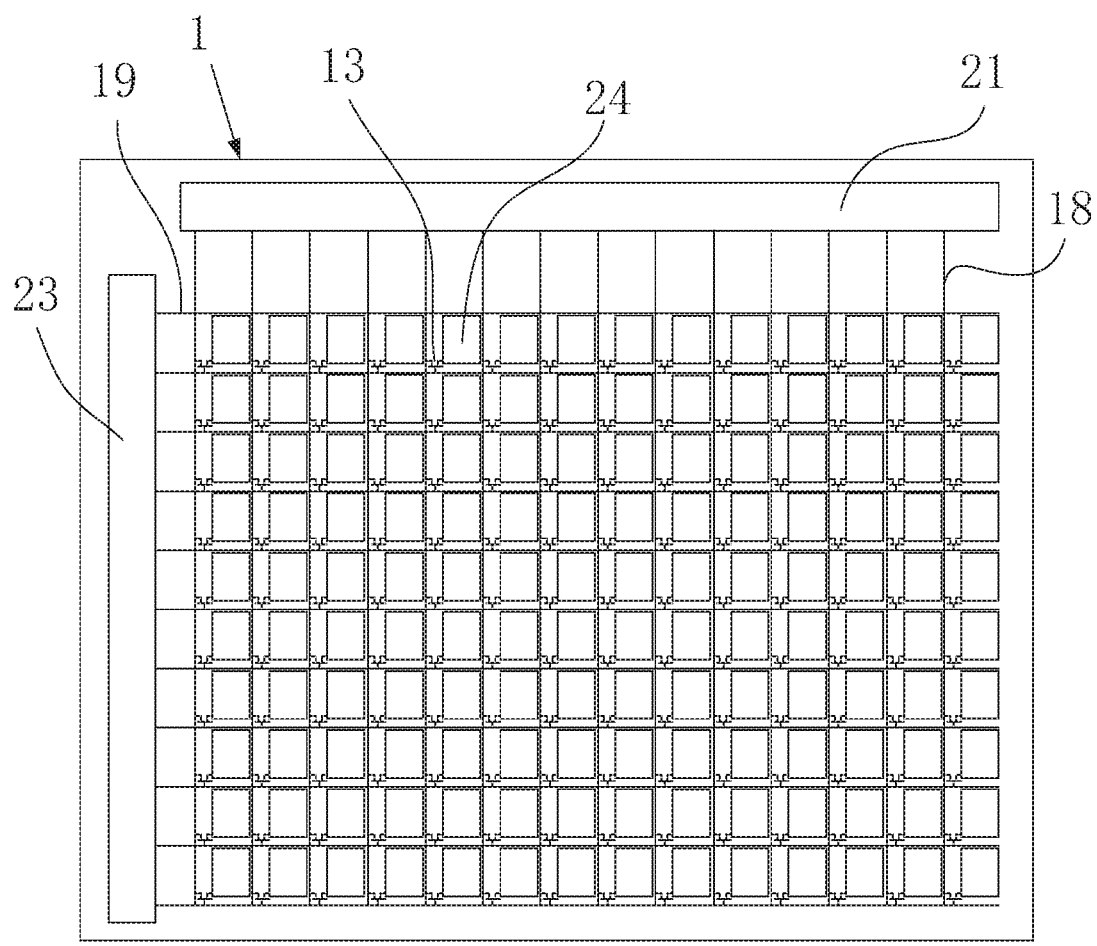
FIG. 3 is a t schematic op view of a display panel of an embodiment of the present disclosure.

Please refer to FIG. 3. The data driving circuit 21 and the scan driving circuit 23 are bonded on edges of the substrate 1, and the scan lines 19 are horizontally disposed in the display area of the substrate 1, and the data lines 18 are vertically disposed in the display area of the substrate 1, and the active switch 13 is electrically coupled to the data line 18 and scan line 19. The plurality of data lines and the plurality of scan lines cross to each other to form rectangular areas, and the plurality of pixels 24 are formed in the rectangular areas, respectively. The pixel 24 is electrically connected to the active switch 13.

Figure 4:
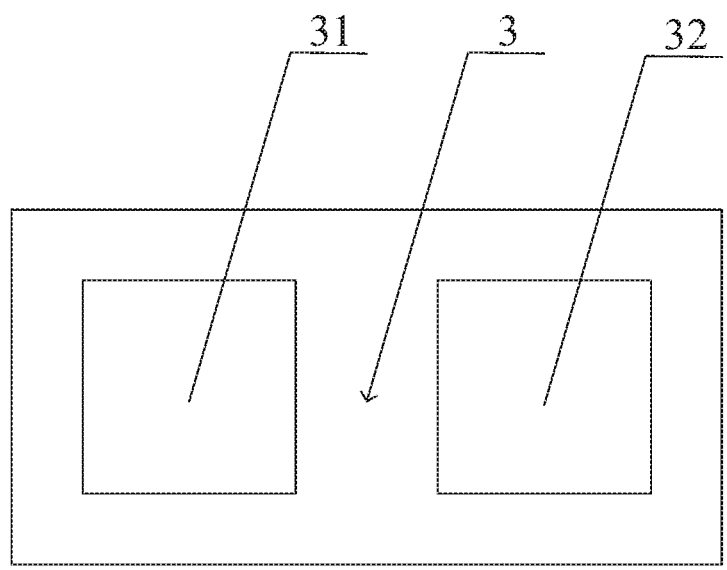
FIG. 4 is a schematic structural view of a display device of an embodiment of the present disclosure.

Please refer to FIG. 4. According to other aspect of the present disclosure, the present disclosure further provides a display device 3, the display device 3 includes a control device 31, and any one of above-mentioned the display panels 32.

In above embodiment, the substrate 1 can be made by glass or plastic.

In above embodiment, the display panel includes liquid crystal panel, OLED display panel, Q LED display panel, plasma panel or other display panel. For example, the liquid crystal panel can include an array substrate and a color film substrate which are disposed opposite to each other. The liquid crystal units and photo spacers are disposed between the array substrate and the color film. The array substrate includes thin-film transistors formed thereon, and the CF substrate includes a color filter layer formed thereon.

In above embodiment, the CF substrate can include a TFT array. The color film and the TFT array can be formed on the same substrate. The array substrate can include a color filter layer.

In above embodiment, the display panel of the present disclosure can be a curved panel.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A display panel, comprising:
   a substrate;
   a plurality of data lines and a plurality of scan lines formed in a display area of the substrate, the plurality of data lines and the plurality of scan lines cross to each other to form rectangular areas;
   a data driving circuit configured to drive the plurality data lines;
   a plurality of active switches disposed in the rectangular areas and electrically connected to the data driving circuit, the plurality of data lines and the plurality of scan lines;
   a control module electrically coupled to control ends of the plurality of active switches; and
   a high level signal port electrically coupled to the control end of each of the plurality of active switches through a resistor;
   wherein when previous frame image information is the same as current frame image information, the control module turns off the plurality of active switches.

2. The display panel according to claim 1, wherein the display panel comprises a control circuit board, and the data driving circuit is disposed on the control circuit board.

3. The display panel according to claim 2, wherein the control circuit board comprises a timing control circuit disposed thereon and configured to store image information, and the timing control circuit is electrically coupled to the data driving circuit.

4. The display panel according to claim 1, wherein each of the plurality of data lines corresponds to one of the plurality of active switches.

5. The display panel according to claim 1, wherein the control end of each of the plurality of active switches is electrically coupled to the same pin of the control module.

6. The display panel according to claim 1, wherein a number of the control pins of the control module is the same as a number of the plurality of active switches, and the control ends of the active switches are electrically coupled to the control pins corresponding thereto, respectively.

7. The display panel according to claim 1, wherein the data driving circuit is electrically connected to an edge of the substrate, and the substrate comprises a fan-out area disposed between the data driving circuit and the plurality of data lines.

8. A driving circuit of a display panel, wherein the driving circuit is electrically coupled to a plurality of data lines formed in a display area of the display panel, the plurality of data lines and a plurality of scan lines cross to each other to form rectangular areas in the display area, the driving circuit comprises:
- a plurality of active switches disposed in the rectangular areas and electrically connected to the data driving circuit, the plurality of data lines and the plurality of scan lines;
- a control module electrically coupled to the control ends of the active switches; and
- a high level signal port electrically coupled to the control end of each of the plurality of active switches through a resistor;
- wherein when the previous frame image information is the same as the current frame image information, the control module turns off the active switches.

9. The driving circuit according to claim 8, wherein the display panel comprises a control circuit board, and the data driving circuit is disposed on the control circuit board.

10. The driving circuit according to claim 9, wherein the control circuit board comprises the timing control circuit disposed thereon and configured to store the image information, and the timing control circuit is electrically coupled to the data driving circuit.

11. The driving circuit according to claim 8, wherein each of the plurality of data lines corresponds to one of the plurality of active switches.

12. The driving circuit according to claim 8, wherein the control end of each of plurality of active switches is electrically coupled to the same pin of the control module.

13. The driving circuit according to claim 8, wherein a number of the control pins of the control module is the same as a number of the plurality of active switches, and the control ends of the plurality of active switches are electrically coupled to the control pins corresponding thereto, respectively.

14. The driving circuit according to claim 8, wherein the data driving circuit is electrically connected to an edge of the substrate, and the substrate comprises a fan-out area disposed between the data driving circuit and the plurality of data lines.

15. A display panel, comprising:
- a substrate;
- a plurality of data lines and a plurality of scan lines formed in a display area of the substrate, the plurality of data lines and the plurality of scan lines cross to each other to form rectangular areas;
- a data driving circuit configured to drive the plurality the data lines;
- a plurality of active switches disposed in the rectangular areas and electrically connected to the data driving circuit, the plurality of data lines, and the plurality of scan lines;
- a control module electrically coupled to control ends of the plurality of active switches;
- a high level signal port electrically coupled to the control ends of the plurality of active switches through a resistor;
- a control circuit board comprising the data driving circuit; and
- a timing control circuit electrically coupled to the control circuit board and the data driving circuit;
- wherein when previous frame image information is the same as current frame image information, the control module turns off the plurality of active switches;
- wherein each of the plurality of data lines corresponds to one of the plurality of active switches;
- wherein a number of the control pins of the control module is the same as a number of the active switches, and the control ends of the plurality of active switches are electrically coupled to the control pins corresponding thereto, respectively.

* * * * *